2,792,308
Patented May 14, 1957

2,792,308

ALKYLENE OXIDE CONDENSATES AND USE THEREOF AS DEFOAMING AGENTS

Roy E. Morse, Indianapolis, Ind., assignor to Monsanto Chemical Company, St. Louis, Mo., a corporation of Delaware No Drawing. Application April 9, 1953,
Serial No. 347,833

6 Claims. (Cl. 99—205)

The present invention relates to novel compositions of matter and to a method of producing same.

The primary object of the invention is to provide new compositions of matter which are eminently suitable for use as defoaming agents in foods.

Another object of the invention is to provide new compositions of matter which are highly effective defoaming agents for fruit juices.

An additional object of the invention is to provide new defoaming agents for fruit juices and food products, which do not impart an off-taste or flavor to the finished product.

A further object of the invention is to provide substantially non-foaming fruit juices and food products.

Other objects and advantages will become apparent to those skilled in the art as the description of the invention unfolds.

These objects are achieved by partially or completely saponifying lard by means of an oxide or hydroxide of an alkali metal, preferably sodium and potassium, and then condensing the resulting product with an alkylene oxide selected from the group consisting of ethylene and propylene oxides. These reactions yield a complex mixture including relatively small but varying quantities of the following compounds, it being understood that a similar series of materials are formed when propylene oxide is used in place of ethylene oxide:

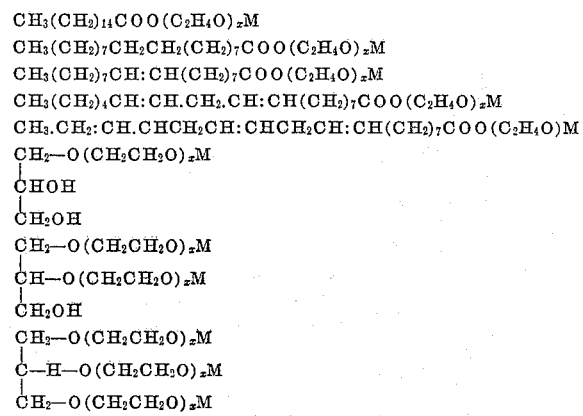

wherein $x$ is a whole number having a total value in the mixture of about 5 to about 10 and M is an alkali metal, preferably sodium and potassium.

The saponification agent is employed in an amount which falls substantially in the range of about 0.5% to about 10% and preferably in the range of about 1% to about 3% by weight. However, it is within the scope of the invention to use larger or smaller amounts if desired.

In carrying out the condensation reaction, about 5 to about 10 mols of the alkylene oxide is reacted with the product obtained by the partial to complete saponification of about 1 mol of lard which has an average molecular weight of about 890. The products obtained by reacting substantially higher or lower molar quantities of alkylene oxide with partially to completely saponified lard are outside the scope of the instant invention since they apparently have no defoaming action.

For a more complete understanding of the present invention, reference is made to the following description of the apparatus and method used in preparing the condensation products of alkylene oxides with partially to completely saponified lard.

The apparatus consisted of a one-liter, three-neck, round-bottom flask equipped with a motor-driven stirrer, thermometer and a gas-outlet tube leading to a mercury manometer which maintained a pressure of 300 mm. of mercury in the reactor. The neck of the flask in which the thermometer was inserted also served as a gas outlet.

The charge to the reactor consisted of lard and a relatively small amount of an alkali metal hydroxide. This charge was heated to about 140° C. in an atmosphere of nitrogen and stirred for one hour to effect partial saponification. The nitrogen was then released and ethylene oxide allowed to flow into the system. An ethylene oxide pressure of 300 mm. Hg was maintained over the lard throughout the reaction which was carried out until the desired number of mols of ethylene oxide had been chemically combined with the saponified lard.

The procedure for preparing a partially saponified lard-ethylene oxide condensate containing about 5 mols of ethylene oxide per mol of lard will now be described, it being understood that the other condensates of the instant invention may be prepared in the same manner.

*Example I*

A mixture of 44.5 grams of lard (average molecular weight: 890) and 8.9 grams of potassium hydroxide was heated to 140° C. in an atmosphere of nitrogen and stirred for 1 hour to effect partial saponification. The resulting product was then reacted with ethylene oxide until the latter had been chemically combined with the saponified lard in a molar ratio of about 5 mols of ethylene oxide per mol of lard.

Condensation products of partially to completely saponified lard with about 5 to about 10 mols of ethylene or propylene are light brown, substantially odorless, liquids which are highly efficient defoaming agents. These defoaming agents are eminently suitable for use in the food industry, and particularly in the concentration of fruit juices since they impart no off-taste or flavor to the finished product. The utility of these products as defoamers or foam-inhibiting agents is demonstrated by the following examples.

*Example II*

500 grams of tomato juice was mixed with 0.10 gram of molten lard and the resulting product heated to a temperature of about 200° C. while being subjected to a reduced pressure of 30 mm. of mercury. The lard thus added exercised no defoaming action on the tomato juice.

*Example III*

The preceding example was repeated using in place of lard, 0.03 gram of the product obtained by initially saponifying lard with potassium hydroxide and then reacting ethylene oxide therewith until about 5.8 mols of ethylene oxide had been chemically combined with the saponified lard. This product provided effective control of the excessive foaming which occurred when the untreated juice was subjected to the test described in Example II.

*Example IV*

The preceding example was repeated using 3,000 grams of tomato juice in a five-liter flask and 0.03 gram of the same ethylene oxide condensate. This condensate was highly effective in controlling the formation of foam when the fruit juice was heated to about 200° C. and subjected to a reduced pressure of 30 mm. of mercury.

*Example V*

The procedure described in Example III was repeated using 1000 grams of tomato juice and 0.03 gram of a similar ethylene oxide-condensate product containing 10 mols of ethylene oxide. This product, when subjected to the test described in Example II, also proved to be a highly effective antifoaming agent for tomato juice.

*Example VI*

500 grams of fresh orange juice and canned pineapple juice were each mixed with 0.03 gram of the condensate of saponified lard containing 5.8 mols of ethylene oxide and subjected to the defoaming test described in Example II, except that a temperature of about 22° C. was employed. In each case, the foaming of the juices was effectively controlled whereas excessive foaming of these juices occurred in the absence of the defoaming agent.

*Example VII*

A 0.35 gram sample of the condensation product of saponified lard containing 10 mols of ethylene oxide was mixed with 100 grams of reconstituted frozen grapefruit juice and the resulting product subjected to a reduced pressure of 30 mm. of mercury. Substantially no foaming occurred, but when the untreated juice was similarly tested, large amounts of foam were produced.

The alkylene oxide condensates of the instant invention are particularly suitable for use as defoamers in the concentration of fruit juices where foaming is a serious problem. Moreover, they find use as defoamers or foam-inhibiting agents in the making of pickles, wine, fermented fruit juices and fermented food products, and also in the preparation of jams and other food products. In addition, they serve as defoamers for aqueous detergents and other aqueous media which have a tendency to foam excessively on agitation or aeration.

The amount of ethylene oxide condensate used to inhibit or minimize foaming may fluctuate within wide limits depending upon various conditions hereinafter described, but it is desirable for economical reasons not to use more than 5% by weight of the above material. In general, about 0.001% to about 3% and preferably about 0.1% to about 0.2% of the ethylene oxide derivative is sufficient to solve the foaming problem encountered in most situations in the food industry. However, it is to be understood that the invention is not restricted to the above numerical limits since larger or smaller amounts may be used, if required.

The minimum, optimum and maximum amount of the alkylene oxide condensate which may be used to inhibit foaming depends upon one or more conditions such as the selected condensate, the medium to be defoamed, the temperature of the medium, the volume to surface ratio of the medium, and the reduced pressure over the medium. Therefore, any attempt to numerically define the concentration of the antifoaming agent so as to meet all situations would be impractical and meaningless. However, since this may be readily determined by those skilled in the art, it is sufficient to say that it may be generically defined by stating that the antifoaming agent is employed in an amount sufficient to substantially inhibit foaming.

What I claim is:

1. The method of substantially inhibiting the development of foam in the concentration of fruit juices, which comprises adding to said juices about 0.001% to about 5% by weight of an antifoaming agent, said agent being the condensation product of about 5 to about 10 mols of an alkylene oxide with the product produced by the partial to complete saponification of about 1 mol of lard by means of a compound selected from the group consisting of the oxides and hydroxides of alkali metals and said alkylene oxide being selected from the group consisting of propylene oxide and ethylene oxide.

2. The method of substantially inhibiting the development of foam in the concentration of fruit juices, which comprises adding to said juices about 0.001% to about 3% by weight of an antifoaming agent, said agent being the condensation product of about 5 to about 10 mols of ethylene oxide with the product produced by the partial saponification of about 1 mol of lard by means of a compound selected from the group consisting of the oxides and hydroxides of alkali metals.

3. The method of substantially inhibiting the development of foam in the concentration of fruit juices, which comprises adding to said juices about 0.001% to about 3% by weight of an antifoaming agent, said agent being the condensation product of about 5 to about 10 mols of propylene oxide with the product produced by the partial saponification of about 1 mol of lard by means of a compound selected from the group consisting of the oxides and hydroxides of alkali metals.

4. The method of substantially inhibiting the development of foam in the concentration of fruit juices, which comprises adding to said juices about 0.001% to about 5% by weight of an antifoaming agent, said agent being the condensation product of about 5.8 mols of ethylene oxide with the product produced by the partial saponification of about 1 mol of lard by means of a compound selected from the group consisting of the oxides and hydroxides of alkali metals.

5. The method of substantially inhibiting the development of foam in the concentration of fruit juices, which comprises adding to said juices about 0.001% to about 5% by weight of an antifoaming agent, said agent being the condensation product of about 10 mols of ethylene oxide with the product produced by the partial saponification of about 1 mol of lard by means of a compound selected from the group consisting of the oxides and hydroxides of alkali metals.

6. The method of substantially inhibiting the development of foam in the concentration of fruit juices, which comprises adding to said juices a sufficient amount of an antifoaming agent to inhibit foaming, said agent being the condensation product of about 5 to about 10 mols of an alkylene oxide with the product produced by the partial to complete saponification of about 1 mol of lard by means of a compound selected from the group consisting of the oxides and hydroxides of alkali metals and said alkylene oxide being selected from the group consisting of propylene oxide and ethylene oxide.

References Cited in the file of this patent

UNITED STATES PATENTS

| | | |
|---|---|---|
| 1,970,578 | Schoeller et al. | Aug. 21, 1934 |
| 1,990,615 | Rodrian et al. | Feb. 12, 1935 |
| 2,131,142 | Orthner et al. | Sept. 27, 1938 |
| 2,593,324 | Steiner et al. | Jan. 3, 1950 |